United States Patent [19]

Itsuki

[11] Patent Number: 5,102,197
[45] Date of Patent: Apr. 7, 1992

[54] SEAT SLIDE DEVICE

[75] Inventor: Noriyasu Itsuki, Akishima, Japan

[73] Assignee: Tacki-S Co., Ltd., Tokyo, Japan

[21] Appl. No.: 612,112

[22] Filed: Nov. 9, 1990

[51] Int. Cl.⁵ .............................................. A62B 35/02
[52] U.S. Cl. ...................................... 297/468; 297/473
[58] Field of Search ............. 297/468, 473, 471; 248/430

[56] References Cited

U.S. PATENT DOCUMENTS

| | | | |
|---|---|---|---|
| 4,482,188 | 11/1984 | Tilley et al. | 297/473 |
| 4,669,782 | 6/1987 | Nishiyama et al. | 297/473 |
| 4,673,217 | 6/1987 | Nishiyama et al. | 297/468 X |
| 4,881,781 | 11/1989 | Borlinghaus et al. | 297/473 |
| 4,940,285 | 7/1990 | Suzuki et al. | 297/473 |

*Primary Examiner*—Laurie K. Cranmer
*Attorney, Agent, or Firm*—Oldham, Oldham & Wilson Co.

[57] ABSTRACT

A seat slide device including upper and lower rails, with a pair of leg brackets provided under the lower rail. Of such two leg brackets, the one is fixed to a rearward lateral surface of the lower rail, in order that a force is escaped down to a floor from a seat belt anchor which is provided on a rearward part of the upper rail, to thereby effectively protect the lower rail against deformation or damage.

8 Claims, 2 Drawing Sheets

SEAT SLIDE DEVICE

BACKGROUND OF THE INVENTION

1. Field of the Invention

The present invention relates to a seat slide device for allowing a seat (for a vehicle) to be adjustably movable in a fore-and-aft direction in a sliding way.

2. Description of Prior Art

A conventional seat slide device is based on such a basic construction comprising an upper rail and lower rail, the former being slidably fitted in the latter for fore-and-aft adjustment of a seat thereon. By and large, the lower rail is supported on a leg bracket fixed on the floor of a vehicle, and the upper rail is formed as a side support member for supporting a seat cushion of the seat, with a seat belt anchor being fixedly provided thereon.

However, in general, such simple seat slide structure is insufficient for protecting the lower rail against removal from the leg bracket in the case of a great force being applied to the slide device per se from the seat. In particular, a laterally applied force may give an intensive impact on the lower rail, when the vehicle is running on a curved road, and as no reinforcing means is provided for the lower rail, it is of a great likelihood that the laterally applied force may deform the lower rail, resulting in the opened upper part of the lower rail being forcibly widened, which deteriorates a smooth sliding relation between the lower and upper rails, since a roller or ball sandwiched therebetween is dislocated and does not act as a slider.

Moreover, in most cases, the rear leg bracket disposed rearwardly of the seat slide device for supporting the rearward part thereof projects more rearwardly than the slide device. This gives an objectionable projection to an occupant sitting on a rear seat in the vehicle, because the projected rear leg bracket will be contacted with a foot of the rear-seat occupant.

SUMMARY OF THE INVENTION

In view of the foregoing drawbacks, it is thus a purpose to provide an improved seat slide device which not only protects its slide rails against deformation and but also avoids contact of a rearward leg bracket with a foot of a rear-seat occupant.

For such purpose, in accordance with the present invention, at least one of leg brackets, which support a lower rail of the slide device from a floor, is fixed on a rearward lateral surface of said lower rail, with an upper rail of the slide device being provided with a seat belt anchor at the rearward part corresponding to that of lower rail.

Accordingly, the leg bracket disposed rearwardly of the seat is disposed laterally of the seat, not rearwardly of the same as in the prior art, thus preventing that bracket from contact with a foot of an occupant sitting on a rear seat. Further, such rearward leg bracket is disposed close to a vertical line on which the seat belt anchor exits; namely, the former is located generally above and adjacent to the latter, whereby a pulling force applied to the seat belt anchor is easily and quickly escaped through the rearward leg bracket down to the floor, thus rendering robust the rail structure enough to resist a great pulling force in such case as a collision or sudden deceleration.

In one aspect of the invention, there is arranged a support plate between the bottom surface of the lower rail and the foregoing rearward leg bracket. Hence, the lower rail is supported by the support plate at its bottom side as well as supported by the leg bracket at its lateral side, whereupon a vertical force is received by the support plate and a horizontal force is received by the leg bracket, thereby enhancing the support for the lower rail from all angles.

DETAILED DESCRIPTION OF PREFERRED EMBODIMENT OF THE INVENTION

Figure 1:
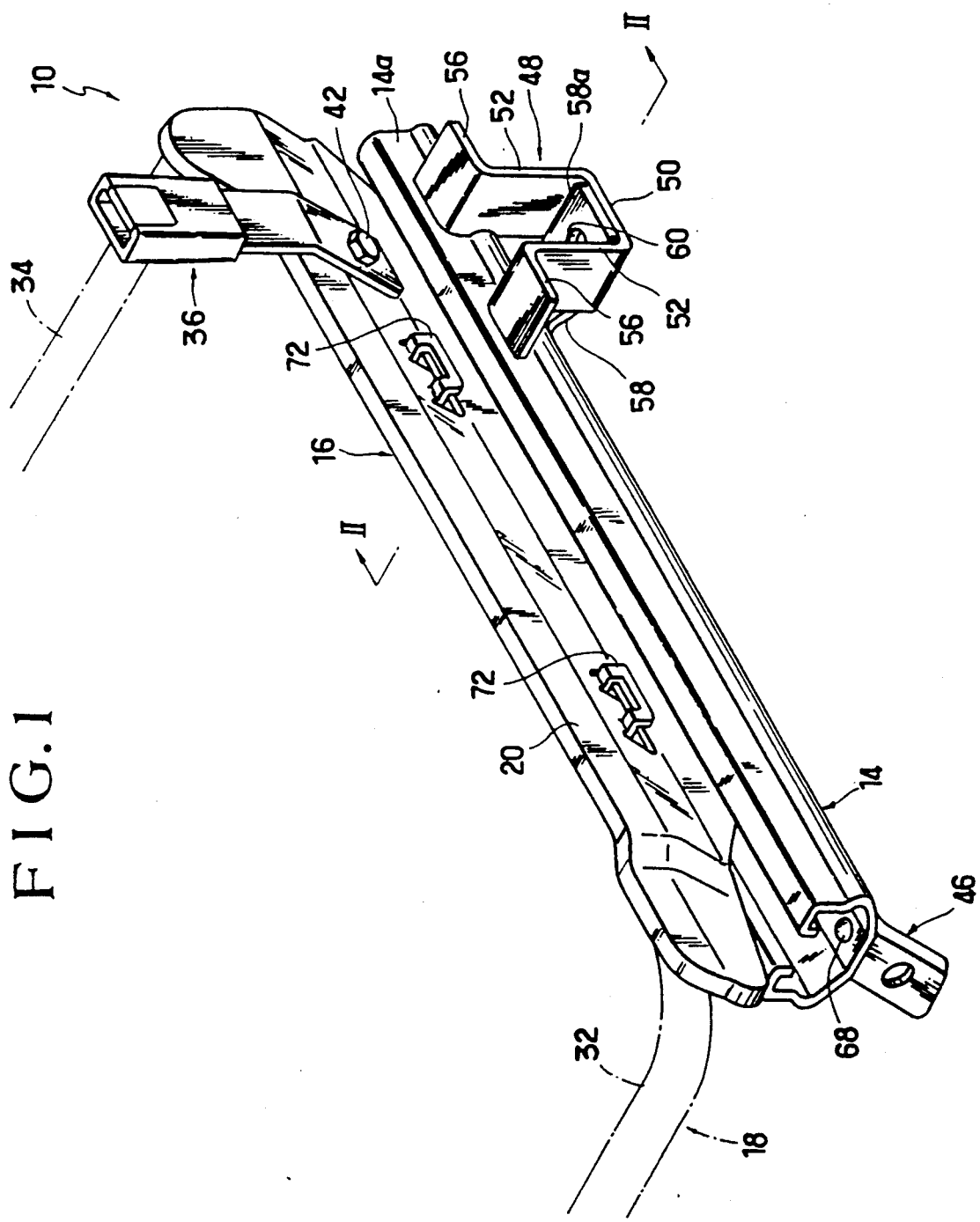
FIG. 1 is a schematic perspective view of a seat slide device in accordance with the present invention.
Figure 2:
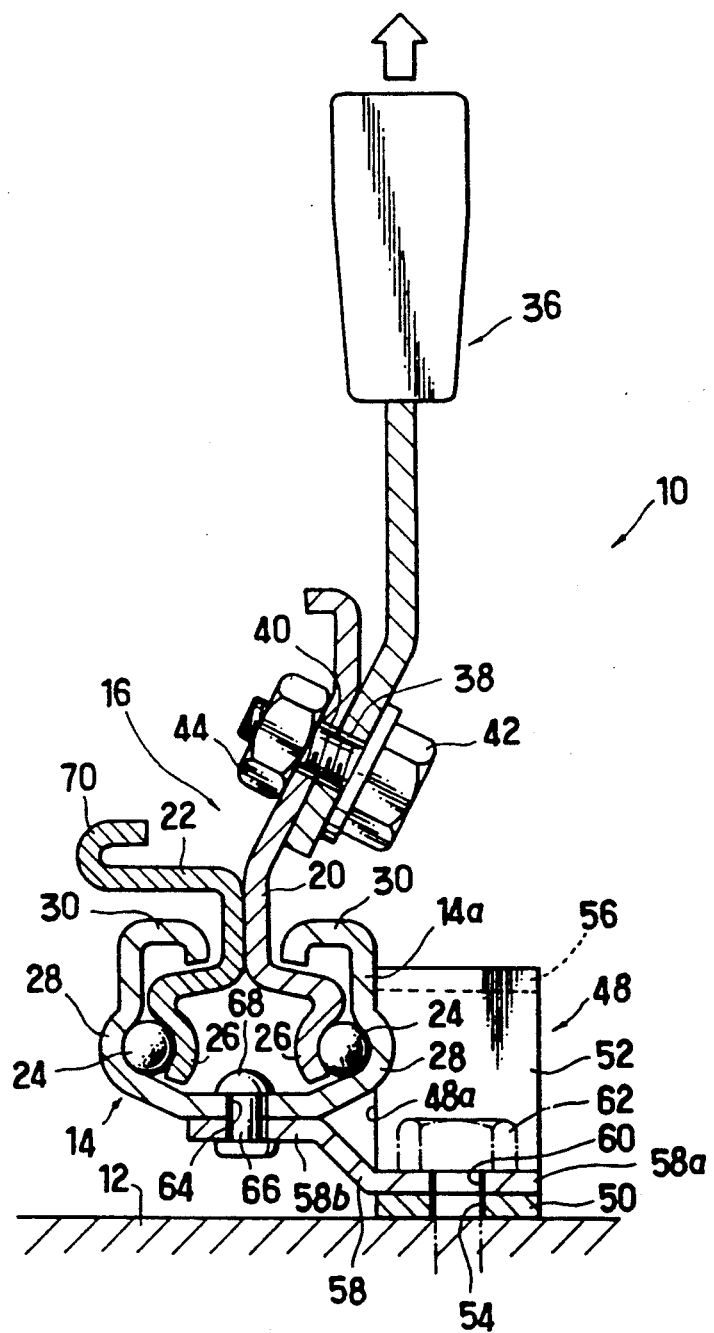
FIG 2 is a sectional view taken along the line II—II.

FIGS. 1 and 2 illustrates a seat slide device in accordance with the present invention, which is generally designated at (10).

The seat slide device (10) comprises a lower rail (14) and an upper rail (16) fitted in the lower rail (14) in a slidable way. As seen from FIG. 1, the device (10) is an integral part of a seat (not shown), forming what is described as a "seat integrated slide rail device", in view of the fact that the upper rail (16) forms a part of a seat cushion frame (18) upon which a seat cushion of the seat is mounted.

Referring to FIG. 2, the upper rail (17) is composed of a pair of first and second rail members (20)(22) in such a manner that they are fixed together at their respective neck areas and bifurcated downwardly therefrom, in a symmetrical way, terminating in the inwardly curved sections (26)(26), respectively, and that the upper portion of the first rail member (20) extends upwardly to form a lateral frame section of the seat cushion frame (18). FIG. 2 shows the state wherein such upper extension of the first rail member (20) is formed with a hole (40) for securing a seat belt anchor (36) to the upper rail (20), for the lower end part of the anchor (36) is secured by means of bolt (42) and nut (44) via the hole (40). The seat belt anchor (36) is disposed at the rearward end area of the upper rail (20) in an ordinary way. On the other hand, the lower rail (14) is formed in a channel cross-section having a pair of symmetrically spaced-apart lateral section and opened section, such that two outwardly swelled or curved parts (28) (28) are formed on each of the lateral sections and two inverted-U-shaped upper parts (30)(30) are formed at the opened section, as shown in FIG. 2.

As illustrated, the lower rail (14) embraces therein the bifurcated lower part of the upper rail (16), with a steel ball (24) being interposed between the inwardly and outwardly curved parts (26)(28), whereby vertical and horizontal load or force may be received in a robust way by the upper and lower rails (16)(14) and further the sliding motion of the upper rail (16) may be made easier and smooth relative to the lower one (14).

The lower rail (14), as understandable from FIGS. 1 and 2, is supported by a forward leg bracket (46) and a rearward leg bracket (48), both of which are fixed on the floor (12) of a vehicle, preferably by means of a securing bolt as indicate by numeral (62).

Specifically, the forward leg bracket (46) is shaped in a dogleg form and fixed by a bolt (68) to the forward end part of the upper rail (14), having the downwardly extending part which is fixed on the floor (12), whereas the rearward leg bracket (46) is disposed at the rearward end area of the lower rail (14). The rearward leg bracket (46) is shown to be located right below the seat belt anchor (36), and formed to have a generally U-shaped configuration by bending a strip of rectangular rigid plate, in a manner to define a pair of horizontally, symmetrically extending upper sections (56)(56) which extends in a direction opposite to each other and along the longitudinal direction of the lower rail (14). Continuously from the respective horizontal upper parts (56), are extended two vertical sections (52)(52) downwardly at a right angle in relation thereto, which are connected together to form a bottom section (50). The two horizontal upper sections (56)(56) of the rear leg bracket (48) are each at its one side (48a) contoured in a shape conforming to the vertical lateral area (14a) and outwardly curved part (24) of the lower rail (14). Thus, as shown, the rearward leg bracket (46) is fixed laterally and outwardly of the lower rail (14) by welding the two horizontal upper sections (56)(56) fast upon the vertical lateral area (14a) of the lower rail (14). In addition, there is provided a support plate (58) between the lower rail (14) and rearward leg bracket (48). The support plate (58) extends its one end (58a) into a space between the two vertical sections (52)(52) of the rearward leg bracket (48), while extending its another end (58b) beneath the lower rail (14). The support plate (58) has, defined midway, an offset area, as clearly seen from FIG. 2, which creates a level difference between those two ends (58a)(58b) to thereby support the upper and lower rails (16)(14) upwardly away from the floor (12) in cooperation with the rearward leg bracket (48). The first end (58a) of the support plate (48) is formed with a securing hole (60) in alignment with a hole (60) formed in the bottom section (50) of the rearward leg bracket (48), whereupon both first end (58a) and bottom section (50) are firmly secured to the floor (12) by means of the bolt (62) as indicated by the phantom line in FIG. 2. The second end (58a) of the same bracket (48) is formed with a securing hole (66) such as to be aligned with a hole (64) formed in the bottom of the lower rail (14), whereupon the second end (58a) is secured firmly to that bottom of the lower rail (14) by means of a rivet (68). In that way, the rearward part of the slide rail device (10) is supported on the floor (12) via the leg bracket (48).

Designation (70) in FIG. 2 stands for a spring securing lug integral with the upper rail (16), to which lug is connected a spring (not shown) of a seat cushion (not shown), and designation (72) stands for a covering member securing lug, to which is secured the terminal end of a covering member which covers the seat cushion, though not shown.

Accordingly, from the descriptions above, the present invention is endowed with the following advantageous effects:

(i) The lower rail (14) is at its outer lateral side supported by the rearward leg bracket (48) and at its bottom supported by the support plate (58), whereby a horizontally applied force is to be received by the former (48) whereas a vertically applied force is to be received by the latter (58). Therefore, the lower rail (14) is supported fast with respect to the floor (12) in a far more robust way against any forces to be applied from all angles.

(ii) The location of the seat belt anchor (36) in the neighborhood of the rearward leg bracket (48) and in particular, the arrangement of both anchor and bracket (36)(48) on nearly the same vertical plane, serves to shorten the distance between the two elements, which allows a pulling force exerted on the anchor (36) to be quickly escaped through the bracket (48) to the floor (12). Thus, a resistance is enhanced between the bracket (48) and lower rail (14), against even a upwardly slant pulling force applied to the anchor (36), so as to prevent the lower rail (14) against removal from the bracket (48).

(iii) The rearward leg bracket (48) is fixed on the lateral uneven surface of the lower rail (14) in conformity therewith, such that the bracket (36) orients its width towards that lateral surface of the lower rail (14), intersecting same vertically. Thus, the opened upper part of the lower rail (14) is thereby prevented from being widened and the balls (24) are stably standwiched between the upper and lower rails (16)(14). Further, in assembling the seat slide device (10) to the floor (12), the steps is simplified by merely bringing the rearward leg bracket (36) laterally to the lower rail (14).

(iv) The rearward leg bracket (36) is in no way contacted with a foot of an occupant sitting on a rear seat disposed behind the slide rail device (10).

While having described the present invention so far, it should be understood that the invention is not limited to the illustrated embodiment, but any other modifications, replacements and additions may structurally be possible without departing from the scopes and spirits of the appended claims. For example, the upper rail (16) is formed to embrace the lower rail (14) in a way contrast to the above-described embodiment, The rearward leg bracket (48) may be located at the inward lateral surface of the lower rail (14), so that the bracket (48) per se is concealed from view, thereby improving an outer easthetical appearance of the seat. The seat belt anchor (36) may be fixed on the lateral surface of the lower rail (14), closer to the rearward leg bracket (48), whereby a pulling force exerted on the seat belt anchor (36) may be directly transmitted to the bracket (48) and escaped more quickly to the floor (12). Instead of the forward leg bracket (46), a similar leg racket to the rearward one (48) may be provided at the forward end part of the lower rail (14). Further, the support plate (58) may be integral with the rearward leg bracket (48).

What is claimed is:

1. A seat slide device, which includes a lower rail and an upper rail fitted slidably in said lower rail, wherein a seat belt anchor is attached to a rearward part of said upper rail, and wherein a pair of leg brackets are provided between said lower rail and a floor, such that they are respectively disposed at forward end and rearward end parts of said lower rail, to support said lower rail, characterized in that one of said leg brackets is a rearward leg bracket which is arranged at a rear part of said lower rail such that said rearward leg bracket is fixed upon a lateral surface of said lower rail and extends laterally therefrom and projects no further back than a rearward end of said lower rail, whereby a foot of a rear seat occupant will not contact said rearward leg bracket.

2. The seat slide device according to claim 1, wherein said rearward leg bracket is fixed on an outer area of said lateral surface of said lower rail.

3. A seat slide device according to claim 1 wherein said rearward leg bracket is fixedly secured to said floor.

4. A seat slide device, which includes a lower rail and an upper rail fitted slidably in said lower rail, wherein a seat belt anchor is attached to a rearward part of said upper rail, and wherein a pair of leg brackets are provided between said lower rail and a floor, such that they are respectively disposed at forward end and rearward end parts of said lower rail, to support said lower rail characterized in that one of said leg brackets is a rearward leg bracket which is so arranged at said lower rail that said rearward leg bracket is disposed laterally of said lower rail and fixed on a lateral surface thereof, and
wherein a support plate is provided beneath a bottom surface of said lower rail, such that one end of said support plate supports said lower rail and another end thereof is fixed on a side of said floor, whereby said rearward leg bracket and support plate cooperate to support said rearward part of said lower rail at both lateral and bottom surfaces thereof.

5. The seat slide device according to claim 4, wherein said one end of said support plate is fixed on said bottom surface of said lower rail, whereas said another end thereof is connected to said rearward leg bracket.

6. A seat slide device, which includes a lower rail and an upper rail fitted slidably in said lower rail, wherein a seat belt anchor is attached to a rearward part of said upper rail, and wherein a pair of let brackets are provided between said lower rail and a floor, such that they are respectively disposed at forward end and rearward end parts of said lower rail, to support said lower rail characterized in that one of said leg brackets is a rearward leg bracket which is so arranged at said lower rail that said rearward leg bracket is disposed laterally of said lower rail and fixed on a lateral surface thereof, and
wherein said rearward leg bracket comprises a generally U-shaped part including a pair of spaced-apart vertical sections and a bottom section, and a part of upper horizontal parts each being formed on respective upper ends of said pair of vertical sections of said generally U-shaped part, wherein said vertical sections are formed in a shape conforming to that of said lateral surface of said lower rail, and attached thereto, and wherein said upper horizontal parts are welded on a planar area of said lateral surface of said lower rail.

7. The seat slide device according to claim 6, wherein said pair of upper horizontal parts of said rearward leg bracket extends from outwardly of said vertical sections of said generally U-shaped part, in a direction opposite to each other.

8. A seat slide device which includes a lower rail and an upper rail fitted slidably in said lower rail, wherein a seat belt anchor is attached to a rearward part of said upper rail, and wherein a pair of leg brackets are provided between said lower rail and a floor, such that they are respectively disposed at forward end and rearward end parts of said lower rail, to support said lower rail, characterized in that one of said leg brackets is a rearward leg bracket which is formed from a rigid plate material and arranged at a rear part of said lower rail such that said rearward leg bracket is fixed on an outer area of a lateral surface of said lower rail and in such a matter as to orient its width in a direction to generally orthogonally intersect said lateral surface of said lower rail, and as not to project any further rearwardly than an adjacent rearward end of said lower rail.

* * * * *